(12) United States Patent
Inoshita

(10) Patent No.: US 8,197,069 B2
(45) Date of Patent: Jun. 12, 2012

(54) PROJECTION APPARATUS, PROJECTION METHOD, AND MEDIUM

(75) Inventor: Atsushi Inoshita, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 463 days.

(21) Appl. No.: 12/398,897

(22) Filed: Mar. 5, 2009

(65) Prior Publication Data

US 2009/0237617 A1    Sep. 24, 2009

(30) Foreign Application Priority Data

Mar. 24, 2008  (JP) .................... 2008-076622
Nov. 27, 2008  (JP) .................... 2008-302741

(51) Int. Cl.
*G03B 21/26*    (2006.01)

(52) U.S. Cl. .......................................... 353/30

(58) Field of Classification Search ............ 353/28, 353/30, 35; 348/588, 565, 569, 629–641; 715/246
See application file for complete search history.

(56) References Cited

U.S. PATENT DOCUMENTS 6,429,856 B1 *   8/2002   Omura et al. ............... 345/175
2006/0098167 A1 *  5/2006   Sato ............................. 353/35

FOREIGN PATENT DOCUMENTS

| JP | 2003-280087 A |   | 10/2003 |
| JP | 2006-091121 A |   | 4/2006 |
| JP | 2006091121 A | * | 4/2006 |
| JP | 2009-63685 A |   | 3/2009 |
| JP | 2009-92801 A |   | 4/2009 |

OTHER PUBLICATIONS

Japanese Office Action dated Jan. 19, 2010 and English translation thereof issued in a counterpart Japanese Application No. 2008-302741.
Japanese Office Action dated Aug. 17, 2010 (and English translation thereof) in counterpart Japanese Application No. 2008-302741.

* cited by examiner

*Primary Examiner* — Georgia Y Epps
*Assistant Examiner* — Renee Naphas
(74) *Attorney, Agent, or Firm* — Holtz, Holtz, Goodman & Chick, PC

(57) ABSTRACT

A projection apparatus includes a projection unit which forms a picture corresponding to an input image signal and projects the formed picture onto an object, a specifying unit which specifies a region in the picture projected by the projection unit, and a projection control unit which causes the region of the picture projected by the projection unit to be limited according to the region specified by the specifying unit.

14 Claims, 9 Drawing Sheets

FIG.7

|  | W1 | W2 | WB |

| W1 | W2 | | |
|---|---|---|---|
| PICTURE ADJUSTMENT | TRAPEZOID CORRECTION | ◉ AUTOMATIC | ○ MANUAL |
| SCREEN SETTING | | − 0 + [ 0 ] ▨▨▨▨▨▨ | |
| INPUT SETTING | ASPECT RATIO | ◉ 4 : 3 | ○ 16 : 9 |
| DEVICE SETTING 1 | FULL SCREEN DISPLAY | ◉ ON | ○ OFF |
| DEVICE SETTING 2 | PROJECTION METHOD | ◉ FRONT | ○ REAR |
| EXPANSION SETTING | START SCREEN | ◉ NONE | ○ LOGO DISPLAY |
| INFORMATION | NO-SIGNAL SCREEN | ◉ BLUE    ○ BLACK | ○ LOGO DISPLAY |
| FULL INITIALIZATION | PICTURE BLANK (COLOR) | ◉ BLACK    ○ GRAY | ○ WHITE |
| | PICTURE BLANK (REGION) | ◉ FULL SCREEN | |
| | | ○ UPPER 1/2   ○ LOWER 1/2 | ○ LEFT 1/2 |
| | | ○ RIGHT 1/2   ○ UPPER 1/4 | ○ LOWER 1/4 |
| | | ○ LEFT 1/4   ○ RIGHT 1/4 | ○ UPPER LEFT 1/4 |
| | | ○ UPPER RIGHT 1/4  ○ LOWER LEFT 1/4 | ○ LOWER RIGHT 1/4 |
| | PICTURE BLANK (CHANGE) | ○ NONE   ◉ MOVE | ○ EXP. / RED. |
| | INITIALIZATION OF PICTURE ADJUSTMENT | | EXECUTE [Ent] |

[△] / [▽] / [◁] / [▷] / [Ent] : SELECT    [Menu] : END

W3

PROJECTION APPARATUS, PROJECTION METHOD, AND MEDIUM

CROSS-REFERENCE TO RELATED APPLICATIONS

This application is based upon and claims the benefit of priority from prior Japanese Patent Applications No. 2008-076622, filed Mar. 24, 2008; and No. 2008-302741, filed Nov. 27, 2008, the entire contents of both of which are incorporated herein by reference.

BACKGROUND OF THE INVENTION

1. Field of the Invention

This invention relates to a projection apparatus, a projection method, and a medium.

2. Description of the Related Art

Jpn. Pat. Appln. KOKAI Publication No. 2003-280087 (patent document) has disclosed the technique for blanking a projected picture temporarily while adjusting the output luminance of the light source lamp without turning off the lamp during projection.

The technique described in the above patent document has taken into account the starting characteristic of an ultrahigh-pressure mercury lamp used as a light source lamp, that is, the time required for the lamp to light up again once the lamp has gone out.

Therefore, the output luminance of the light source lamp is adjusted according to two states, the display and nondisplay of a picture. When a picture is muted, the image is, of course, brought into the nondisplay state to stop displaying the entire projected picture.

With the recent popularization of personal computers (PCs), it is commonplace to connect a PC to a projection unit and make a presentation.

In this type of presentation, it is highly likely that pictures will be projected using, for example, a whiteboard as a screen, not a special screen. In that case, the whiteboard functions not only as a screen but also as a whiteboard on which various types of information, including questions, suggestions, and points related to the presentation, are written with a marker pen.

When the whiteboard is used as a screen, with a large part of the whiteboard being occupied only by the projection region because the area of the whiteboard is small, there is no space in which characters or the like are to be written. Therefore, characters or the like have to be written into the projection region. Since what has been written overlaps with what has been projected, it is very difficult to read what has been written.

BRIEF SUMMARY OF THE INVENTION

It is, accordingly, an object of the invention to provide a projection apparatus, a projection method, and a medium which are capable of securing a region suitable for writing, while projecting the main part of the picture.

According to an aspect of the invention, there is provided a projection apparatus comprising: a projection unit which forms a picture corresponding to an input image signal and projects the formed picture onto an object; a specifying unit which specifies a region in the picture projected by the projection unit; and a projection control unit which causes the region of the picture projected by the projection unit to be limited according to the region specified by the specifying unit.

According to another aspect of the invention, there is provided a projection method in an apparatus which includes a projection unit that forms a picture corresponding to an input image signal and projects the formed picture onto an object, the projection method comprising: a specifying step of specifying a region in the picture projected by the projection unit; and a projection control step of causing the region of the picture projected by the projection unit to be limited according to the region specified in the specifying step.

According to still another aspect of the invention, there is provided a medium which stores a program executable on a computer included in an apparatus which includes a projection unit that forms a picture corresponding to an input image signal and projects the formed picture onto an object, the program causing the computer to execute: a specifying step of specifying a region in the picture projected by the projection unit; and a projection control step of causing the region of the picture projected by the projection unit to be limited according to the region specified in the specifying step.

BRIEF DESCRIPTION OF THE SEVERAL VIEWS OF THE DRAWING

FIG. 7 is a diagram illustrating a projection screen where Picture Blank has been selected from the items on the submenu "Picture Setting" in the second embodiment;

DETAILED DESCRIPTION OF THE INVENTION (First Embodiment)

Hereinafter, referring to the accompanying drawings, a Digital Light Processing (DLP, registered trademark) data projection unit according to a first embodiment of the invention will be explained.

Figure 1:
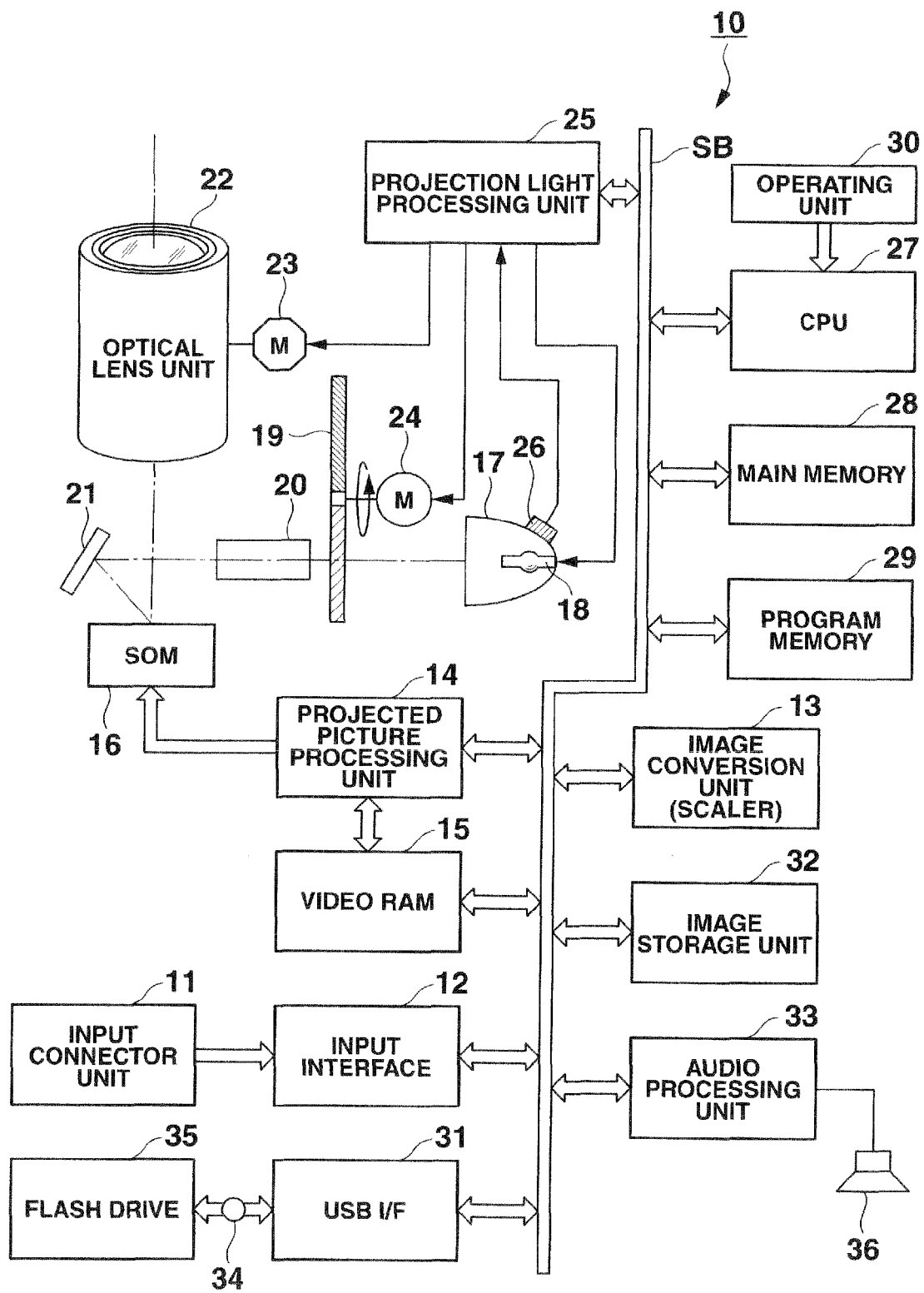
FIG. 1 is a block diagram schematically showing a functional configuration of a data projection unit according to a first embodiment of the invention.

FIG. 1 is a block diagram schematically showing a functional configuration of the data projection unit 10 of the first embodiment. In FIG. 1, numeral 11 indicates an input connector unit, which is composed of, for example, a pin-jack (RCA) video input terminal and an RGB input terminal.

Image signals conforming to various standards input from the input connector unit 11 are supplied via an input interface 12 and a system bus SB to an image conversion unit 13 (also referred to as a scaler). The image conversion unit 13 standardizes the image signals into those in a specific format suitable for projection and then sends the resulting signals to a projected picture processing unit 14.

At this time, not only various characters and pointers for on-screen display (OSD) but also frame images corresponding to temporal information explained later are also sent to the projected picture processing unit 14 to superimpose those signals on the image signal as needed.

The projected picture processing unit 14 expands the received image signal on a video RAM 15 and stores result data in the RAM 15. From the contents stored in the RAM 15, the projected picture processing unit 14 generates a video signal. With much higher speed time-division driving realized by multiplying the frame rate of the video signal, such as 60 frames/second, by the division number of color components and the number of display tones, the projected picture processing unit 14 drives a micromirror device 16 acting as a spatial light modulation device (SOM).

A light source lamp 18 using, for example, an ultrahigh-pressure mercury lamp, which is provided in a reflector 17, emits high-intensity white light. The white light emitted by the light source lamp 18 is dyed in primary colors in a time-division manner via a color wheel 19 which rotates at high speed in synchronization with the display at the micromirror device 16. An integrator 20 turns the dyed light into a light flux whose luminance distribution is uniform. The light flux is then reflected totally by a mirror 21 and projected onto the micromirror device 16.

Then, the reflected light from the micromirror device 16 forms a picture. The picture is projected via an optical lens unit 22 onto a screen (not shown) acting as a projection object.

The optical lens unit 22, which enlarges the picture formed by the micromirror device 16 and projects the enlarged picture onto an object, such as a screen, can vary the focused focal point position and zoom position (projection field angle) arbitrarily.

That is, a focus lens (not shown) and a zoom lens (not shown) in the optical lens unit 22 are controlled so as to move back and forth along the optical axis. Those lenses are moved by the revolution drive of a stepping motor (M) 23.

The lighting of the light source lamp 18, the revolution drive of the motor (M) 24 of the color wheel 19, and the revolution drive of the stepping motor 23 are all performed by the projection light processing unit 25.

In addition, temperature data from a temperature sensor 26 which is provided on the reflector 17 and senses the temperature of the light source lamp 18 is input to the projection light processing unit 25.

A CPU 27 controls all of the operations of the above circuits. The CPU 27 executes control operations in the data projection unit 10 using a program memory 29 composed of a main memory 28 made up of a DRAM and a program memory 29 made up of an electrically rewritable nonvolatile memory in which operation programs, various types of data, and others have been stored.

The CPU 27 executes various projection operations according to a manipulate signal from an operating unit 30. The operating unit 30 includes a key operation unit provided on the package of the data projection unit 10 and an infrared receiving unit which receives an infrared modulation signal from a remote controller (not shown) dedicated to the data projection unit 10. The operating unit 30 outputs directly to the CPU 27 a key code signal on the basis of the key operated directly or via the remote controller by the user.

Each of the key operating unit and remote controller includes the following operation keys: for example, a power key, a "Menu" key, cursor keys (upward, downward, rightward, and leftward keys), an "Ent" key, an "Esc" key, and a picture blank key.

The CPU 27 is further connected via the system bus SB to a USB interface 31, an image storage unit 32, and an audio processing unit 33.

The USB interface 31 performs input-output control of data via an USB terminal 34 with an externally connected device. When a flash drive 35 is connected to the USB terminal 34, if image data in a specific file format, such as data in Joint Photographic Experts Group (JPEG) files or bit map (BMP) files in the case of still images, or data in Audio-Video Interleaved (AVI) (MPEG-4/Motion JPEG) files in the case of moving images, has been stored in the flash drive 35, the USB interface 31 can read the data and send it to the image conversion unit 13 for projection.

Under the control of the CPU 27, the image storage unit 32 stores a fixed number of frames of image data input from the input connector unit 11 or flash drive 35.

The audio processing unit 33, which includes a sound source circuit, such as a PCM sound source, converts audio data supplied in a projection operation and drives a speaker unit 36 to produce a loud sound or a beep sound or the like if necessary.

Next, the operation of the first embodiment will be explained.

Figure 2:
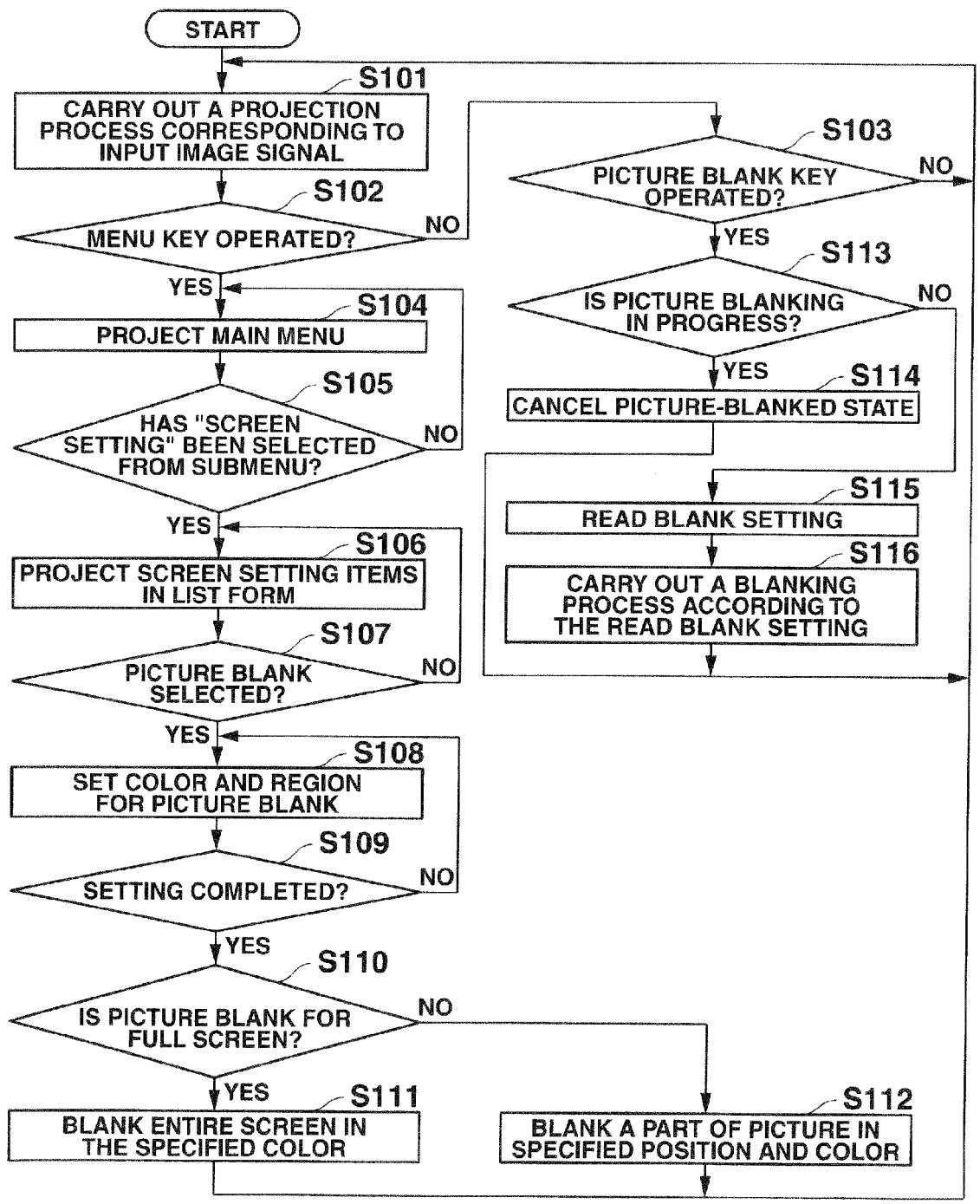
FIG. 2 is a flowchart to explain the process of setting and executing a projection operation and a picture blanking operation in the first embodiment.

FIG. 2 shows the contents of the process related to the setting and execution of picture blanking performed mainly in parallel with the projection operation. The CPU 27 controls all of the processes, while reading the operation program stored in the program memory 29 and expanding it on the main memory 28.

At the beginning of the operation, the CPU 27 carries out a projection process (step S101). In the projection process, the micromirror device 16 forms a corresponding picture according to the image signal input via the input connector unit 11 and the optical lens unit 22 projects the picture onto the screen (not shown).

At the same time, the operating unit 30 determines whether "Menu" key has been operated (step S102) and then whether the picture blank key has been operated (step S103).

Then, the CPU repeats the process of returning to step S101 if those key have not been operated, waiting for the menu key or picture blank key to be operated, while executing a projection operation corresponding to the input image.

If in step S102, it has been determined that "Menu" key has been operated, the CPU 27 temporarily stops projection corresponding to the image signals input until then according to the key operation and instead not only projects the main menu or projects the main menu so as to superimpose it on a part of the screen, while continuing the projection (step S104) but also waits for "Screen Setting" to be selected as a submenu in the main menu (step S105).

Then, if in step S105, it has been determined that "Screen Setting" in the submenu has been selected, the CPU 27 not only projects the screen setting items in list form (step S106) but also waits for "Picture Blank" to be selected as an item (step S107).

Figure 3:
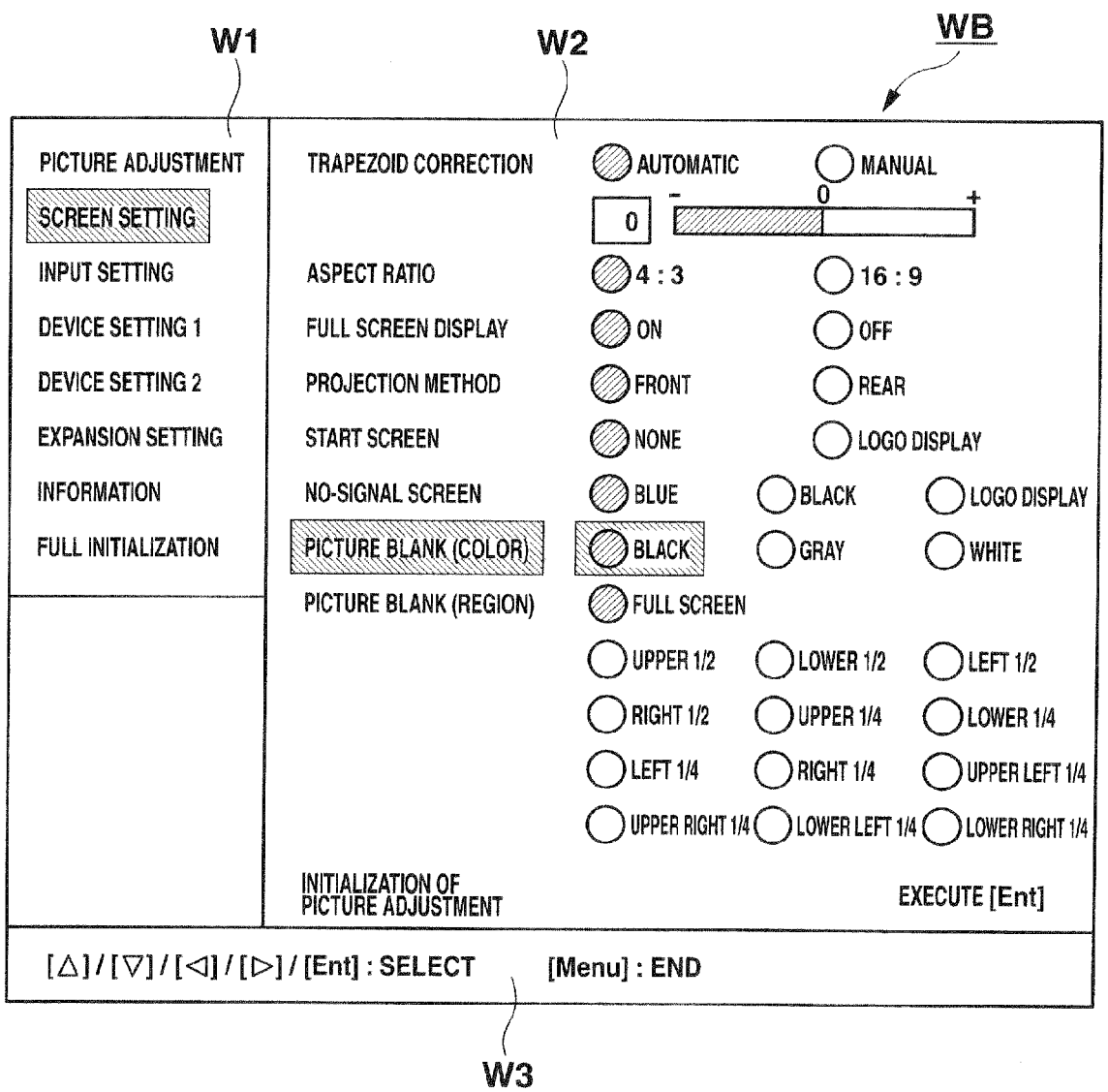
FIG. 3 is a diagram illustrating a projection screen where Picture Blank has been selected from the items on the submenu "Picture Setting" in the first embodiment.

FIG. 3 is a diagram illustrating a projection screen on the whiteboard WB where "Picture Blank" has been selected from the items in the submenu "Picture Setting."

In FIG. 3, in window W1 at the top left, "Picture Adjustment," "Screen Setting," "Input Setting," "Device Setting 1," "Device Setting 2," "Expansion Setting," "Information," and "Full Initialization" are enumerated as the submenu. The highlighted item indicates that "Screen Setting" has been selected at that time.

In parallel with this, a large part of the remaining screen is used as window W2. In window W2, all the items constituting the contents of the submenu "Screen Setting" are projected in list form.

Specifically, in window W2, the contents of the setting can be selected for each of the following items: "Trapezoid Correction," "Aspect Ratio," "Full Screen Display," "Projection Method," "Start Screen," "No Signal Screen," "Picture Blank (Color)," and "Picture Blank (Region)." FIG. 3 shows a case where "Picture Blank (Color)" has been selected and "Black" has been selected as its contents.

Here, in the item "Picture Blank (Color)," any one of "Black," "Gray," and "White" can be selected.

"Black" indicates that a region where picture blanking is done is brought into a shadow state where no light is shed. "Gray" indicates that a region where picture blanking is done is irradiated with an achromatic intermediate tone including no color component. For example, when the data projection unit 10 is used in a darkroom environment where there is no light, "Gray" is suited for irradiating the region to be written into to the extent that the region is not too light.

"White" indicates that a region where picture blanking is done is irradiated with an achromatic full tone including no color component. For example, when the data projection unit 10 is used in a dim environment, "White" is suited for brightly irradiating the region to be written into.

In the item "Picture Blank (Region)," any one of "Full Screen," "Upper Half (½)," "Lower Half (½)," "Left Half (½)," "Right Half (½)," "Upper Quadrant (¼)," "Lower Quadrant (¼)," "Left Quadrant (¼)," "Right Quadrant (¼)," "Upper Left Quadrant (¼)," "Upper Right Quadrant (¼)," "Lower Left Quadrant (¼)," and "Lower Right Quadrant (¼)" can be selected as a region to be masked by mask blanking.

With the projection screen, in window W3 positioned in the lowest row, each item and its contents can be selected by operating the upward and downward cursor keys and "Ent" key. In addition, [Menu]: End indicates operating "Menu" key again causes the menu screen to be terminated.

The contents based on the setting of the picture blank are all stored in the program memory 29. Even after the power supply of the data projection unit 10 has been turned off, the stored contents are held.

If in step S107, it has been determined that "Picture Blank" has been selected, control proceeds to the process of setting the color and region of the picture blank as shown in FIG. 3 according to the selection (step S108).

Then, a color and a region for picture blanking are selected and set arbitrarily. While the setting process is being performed, it is determined whether the setting has been completed, thereby waiting for the end of the setting (step S109).

If "Menu" key in the operating unit 30 has been operated to terminate the picture blank setting process, it is determined in step S109 whether "Menu" key has been operated, thereby determining whether or not the region of the picture blank newly set is "Full Screen" (step S110).

If it has been determined that the region of the picture blank set here is "Full Screen," setting is done to blank the entire projected picture in the set color (step S111). In the setting state, control returns to the processes in step S101 and forward.

Figure 4A:
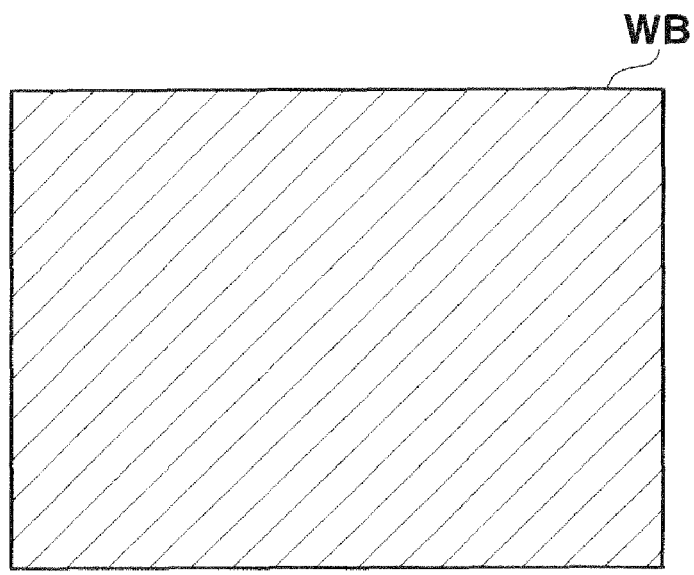
FIGS. 4A to 4C show concrete examples of picture blanking in the first embodiment.

FIG. 4A shows a picture blanked state at this time. The entire projection screen is masked on the basis of the set color, regardless of the originally input image signal.

At this time, even if the set color is "Black" and no light is shed on the whiteboard WB acting as a screen, the light source lamp 18 continues emitting light. The light shed via the mirror 21 on the micromirror device 16 is all reflected so as to avoid the projection axis to the optical lens unit 22.

If it has been determined that the region of picture blanking set in step S110 is other than "Full Screen," the projected picture is partially blanked according to the set color and region (step S112). In the state, control returns to the processes in step S101 and forward.

Figure 4B:
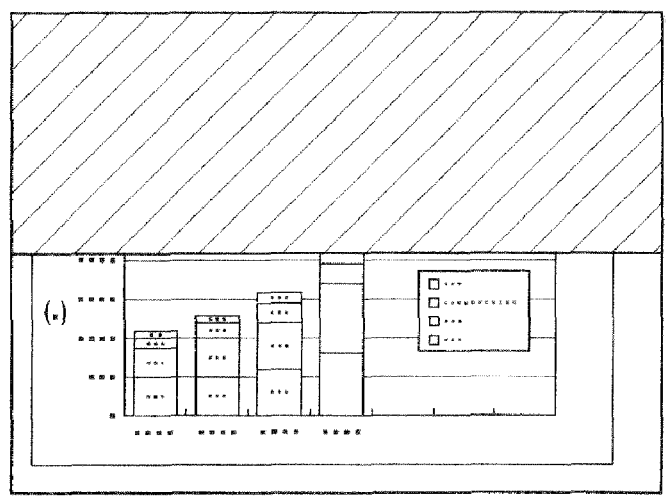
Figure 4C:
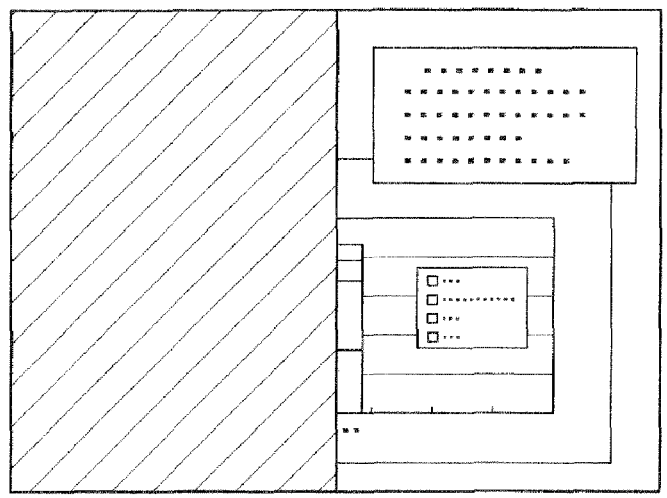
Figure 5A:
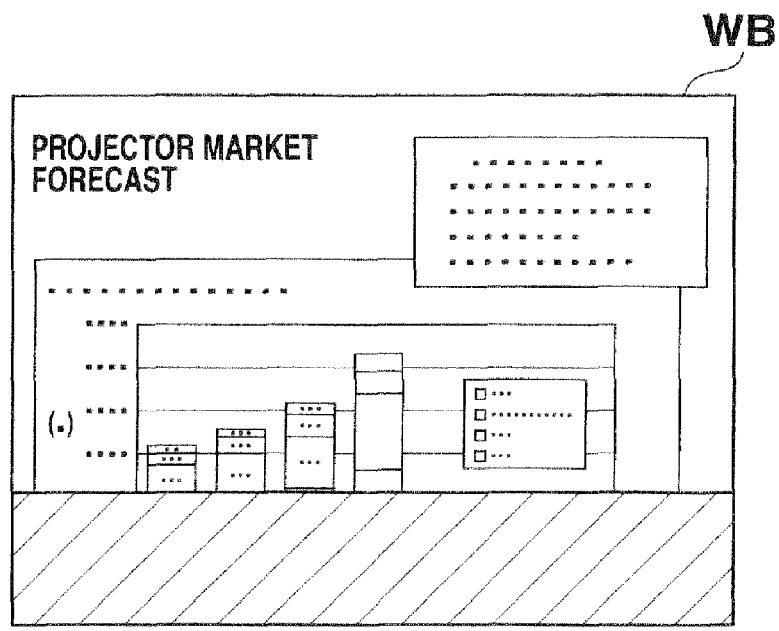
FIGS. 5A and 5B show concrete examples of picture blanking in the first embodiment.
Figure 5B:
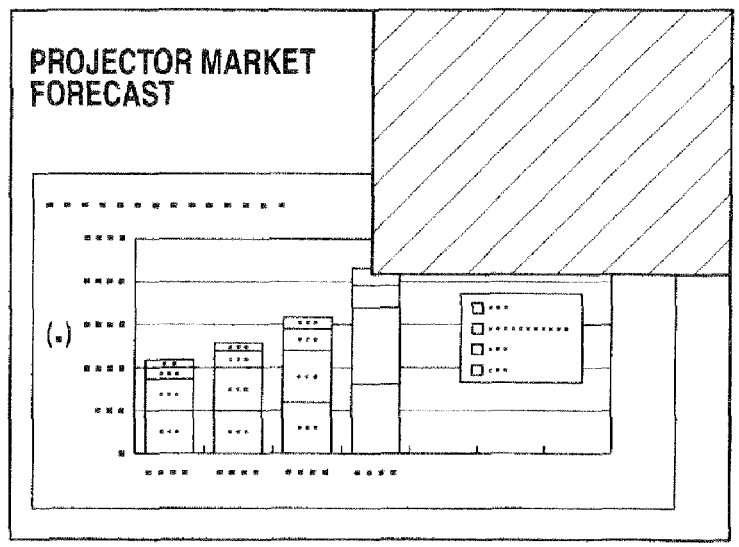

Each of FIGS. 4B, 4C, 5A, and 5B shows a picture-blanked state when a partial region has been set. Specifically, FIG. 4B shows a picture-blanked state where the upper half of the screen has been masked. FIG. 4C shows a picture-blanked state where the left half of the screen has been masked. FIG. 5A shows a picture-blanked state where the lower quadrant of the screen has been masked. FIG. 5B shows a picture-blanked state where the upper right quadrant of the screen has been masked.

As described above, when partial picture blanking has been set, the projected picture processing unit 14, under the control of the CPU 27, causes the micromirror device 16 to display a picture painted in the set uniform color preferentially in the masked part of the picture based on the input image signal, thereby causing a picture as shown to be projected.

To cancel the picture-blanked state of the projected picture, the picture blank key in the operating unit 30 is operated.

Specifically, if the picture blank key has been operated in a state where the processes in step S102 to step S103 are being executed repeatedly, it is determined whether the picture blank key has been operated and then whether picture blanking is in progress at that time (step S113).

If it has been determined that picture blanking is in progress, the picture-blanked state is cancelled immediately and a normal state where a picture is projected on the entire screen on the basis of the input image signal is restored (step S114). Thereafter, control returns to the processes in step 101 and forward.

If it has been determined that the picture blank key has been operated in the operating unit 30 in a state where picture blanking has not been performed in step S113, the setting of picture blanking supposed to be done beforehand is read from the program memory 29 to go into a new picture-blanked state (step S115).

Then, the projected picture is blanked according to the newly set color and region on the basis of the read contents (step S116). In this state, control is returned to the processes in step S101 and forward.

As described above, with the first embodiment, even if the area of the whiteboard WB serving as a screen is insufficient for the region of the projected picture, it is possible to secure a region suitable for writing, while projecting the main part of the picture.

In addition, with the first embodiment, specifying one of a plurality of regions prepared in advance in the region of the projected picture enables partial picture blanking to be performed in the specified region. Therefore, when the user makes a simple selection by specifying an arbitrary region at that time, this makes it possible to secure a region suitable for writing or the like without impeding the projection of the main part according to the contents of the projected picture.

Furthermore, with the first embodiment, when picture blanking is performed, not only a region but also a color can be selected. This makes it possible to set the color of the picture-blanked part suitable for writing or the like according to the projection environment, such as projection in a completely darkened room, projection in a dim environment, or projection in a light environment.

(Second Embodiment)

Hereinafter, a DLP (registered trademark) data projection unit according to a second embodiment of the invention will be explained with reference to the accompanying drawings.

Since a schematic functional configuration of a data projector unit 10 of the second embodiment is basically the same as that of FIG. 1, the same parts are indicated by the same reference numerals and an explanation of them will be omitted.

The operation of the second embodiment will be explained.

Figure 6:
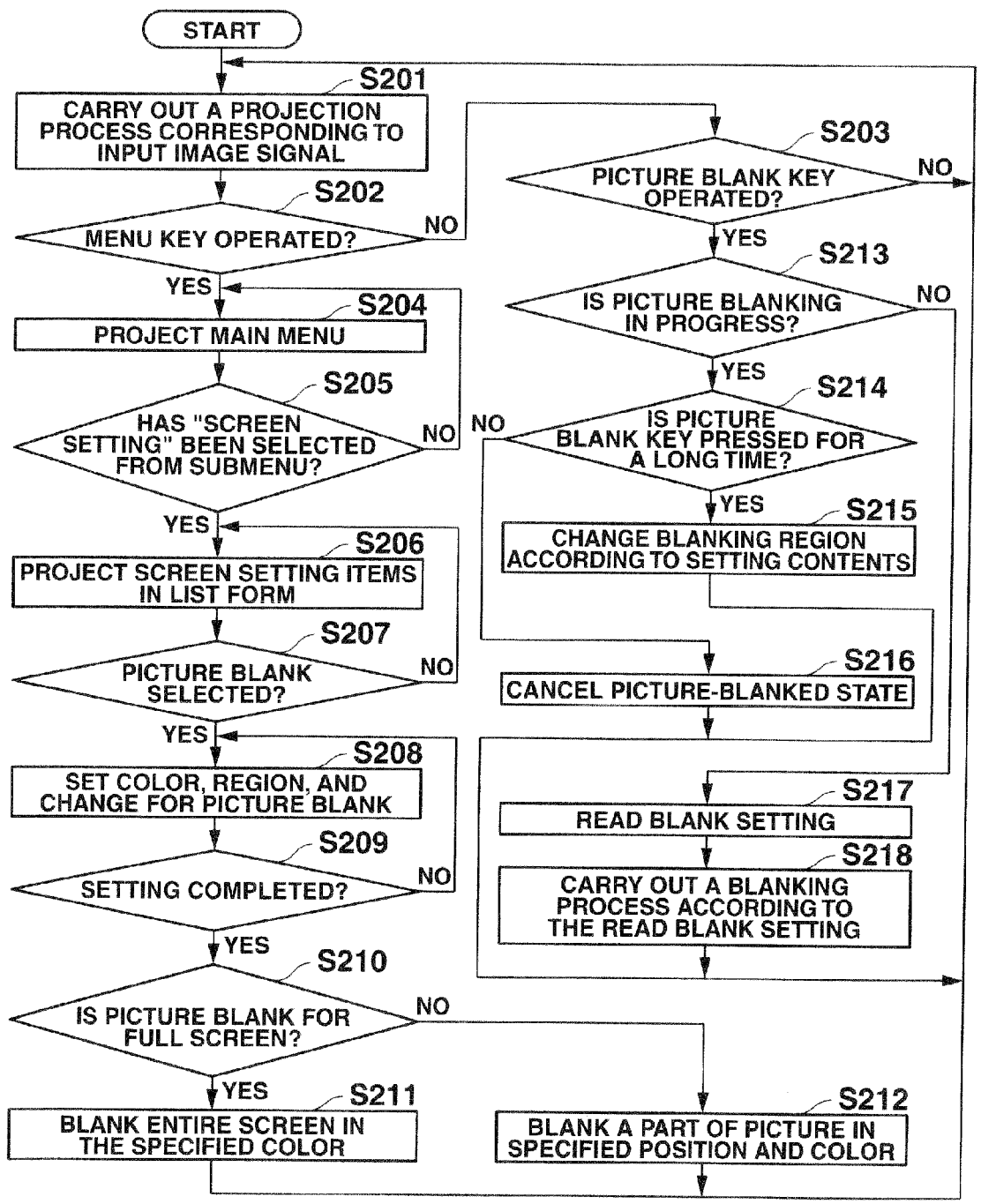
FIG. 6 is a flowchart to explain the process of setting and executing a projection operation and a picture blanking operation in a data projection unit according to a second embodiment of the invention.

FIG. 6 shows the contents of the processes related to the setting and execution of picture blanking performed mainly in parallel with the projection operation. The CPU 27 controls all of the processes, while reading the operation program stored in the program memory 29 and expanding it on the main memory 28.

At the beginning of the operation, the CPU 27 carries out a projection process (step S201). In the projection process, the micromirror device 16 forms a corresponding picture according to the image signal input via the input connector unit 11 and the optical lens unit 22 projects the picture onto the screen (not shown).

At the same time, the operating unit 30 determines whether "Menu" key has been operated (step S202) and then whether the picture blank key has been operated (step S203).

Then, the CPU repeats the process of returning to step S201 if those key have not been operated, waiting for the menu key or picture blank key to be operated, while executing a projection operation corresponding to the input image.

If in step S202, it has been determined that "Menu" key has been operated, the CPU 27 temporarily stops projection corresponding to the image signals input until then according to the key operation and instead not only projects the main menu or projects the main menu so as to superimpose it on a part of the screen, while continuing the projection (step S204) but also waits for "Screen Setting" to be selected as a submenu in the main menu (step S205).

Then, if in step S205, it has been determined that "Screen Setting" in the submenu has been selected, the CPU 27 not only projects the screen setting items in list form (step S206) but also waits for "Picture Blank" to be selected as an item (step S107).

FIG. 7 is a diagram illustrating a projection screen on the whiteboard WB where "Picture Blank" has been selected from the items in the submenu "Picture Setting."

In FIG. 7, in window W1 at the top left, "Picture Adjustment," "Screen Setting," "Input Setting," "Device Setting 1," "Device Setting 2," "Expansion Setting," "Information," and "Full Initialization" are enumerated as the submenu. The highlighted item indicates that "Screen Setting" has been selected at that time.

In parallel with this, a large part of the remaining screen is used as window W2. In window W2, all the items constituting the contents of the submenu "Screen Setting" are projected in list form.

Specifically, in window W2, the contents of the setting can be selected for each of the following items: "Trapezoid Correction," "Aspect Ratio," "Full Screen Display," "Projection Method," "Start Screen," "No-Signal Screen," "Picture Blank (Color)," "Picture Blank (Region)," and "Picture Blank (Change)." FIG. 7 shows a case where "Picture Blank (Change)" has been selected and "Move" has been selected as its contents.

Here, in the item "Picture Blank (Change)," any one of "None," "Move," and "Expansion/Reduction (Exp./Red.)" can be selected.

"None" indicates that a picture blanking region according to a specific key operation, such as a long-pressing key operation of the picture blank key, is caused to remain unchanged. "Move" indicates that a picture blanking region according to a specific key operation is moved sequentially.

"Expansion/Reduction" indicates that a picture blanking region according to a specific key operation is expanded sequentially and, when the region has reached the full screen, the region is then reduced sequentially.

With the projection screen, in window W3 positioned in the lowest row, each item and its contents can be selected by operating the upward and downward cursor keys and "Ent" key. In addition, [Menu]: End indicates operating "Menu" key again causes the menu screen to be terminated.

The contents based on the setting of the picture blank are all stored in the program memory 29. Even after the power supply of the data projection unit 10 has been turned off, the stored contents are held.

If in step S207, it has been determined that "Picture Blank" has been selected, control proceeds to the process of setting the color and region of the picture blank as shown in FIG. 7 according to the selection (step S208).

Then, a color, a region, and a change for picture blanking are selected and set arbitrarily. While the setting process is being performed, it is determined whether the setting has been completed, thereby waiting for the end of the setting (step S209).

If "Menu" key in the operating unit 30 has been operated to terminate the picture blank setting process, it is determined in step S209 whether "Menu" key has been operated, thereby determining whether or not the region of the picture blank newly set is "Full Screen" (step S210).

If it has been determined that the region of the picture blank set here is "Full Screen," setting is done to mute the entire projected picture in the set color (step S211). In the setting state, control returns to the processes in step S201 and forward.

FIG. 4A shows a picture blanked state at this time. The entire projection screen is masked on the basis of the set color, regardless of the originally input image signal.

At this time, even if the set color is "Black" and no light is shed on the whiteboard WB acting as a screen, the light source lamp 18 continues emitting light. The light shed via the mirror 21 on the micromirror device 16 is all reflected so as to avoid the projection axis to the optical lens unit 22.

If it has been determined that the region of picture blank set in step S210 is other than "Full Screen," the projected picture is partially blanked according to the set color and region (step S212). In the state, control returns to the processes in step S201 and forward.

Each of FIGS. 4B, 4C, 5A, and 5B shows a picture-blanked state when a partial region has been set. Specifically, FIG. 4B shows a picture-blanked state where the upper half of the screen has been masked. FIG. 4C shows a picture-blanked state where the right left half of the screen has been masked. FIG. 5A shows a picture-blanked state where the lower quadrant of the screen has been masked. FIG. 5B shows a picture-blanked state where the upper right quadrant of the screen has been masked.

As described above, when partial picture blanking has been set, the projected picture processing unit 14, under the control of the CPU 27, causes the micromirror device 16 to display a picture painted in the set uniform color preferentially in the masked part of the picture based on the input image signal, thereby causing a picture as shown to be projected.

To cancel the picture-blanked state of the projected picture, the picture blank key in the operating unit 30 is operated.

Specifically, if the picture blank key has been operated in a state where the processes in step S202 to step S203 are being executed repeatedly, it is determined whether the picture blank key has been operated and then whether picture blanking is in progress at that time (step S213).

If it has been determined that picture blanking is in progress, it is determined whether the key operation for picture blanking is a long-pressing operation, depending on whether the time from when the key is operated until the picture-blanked state is cancelled is equal to or longer than a specific length of time, for example, 1.0 second (step S214).

If it has been determined that the picture blank key has not been pressed for a long time, the picture-blanked state is cancelled immediately and a normal state where a picture is projected on the entire screen on the basis of the input image signal is restored (step S216). Thereafter, control returns to the processes in step 201 and forward.

If in step S214, it has been determined that the picture blank key has not been pressed for a long time, the region of picture blanking is changed according to the changed contents of picture blanking set at that time and the operate time of the picture blank key (step S215).

FIGS. 8A to 8D are diagrams showing the transition of projected picture when the picture blank key has been pressed for a long time, with "Move" being set as the change of picture blanking.

Figure 8A:
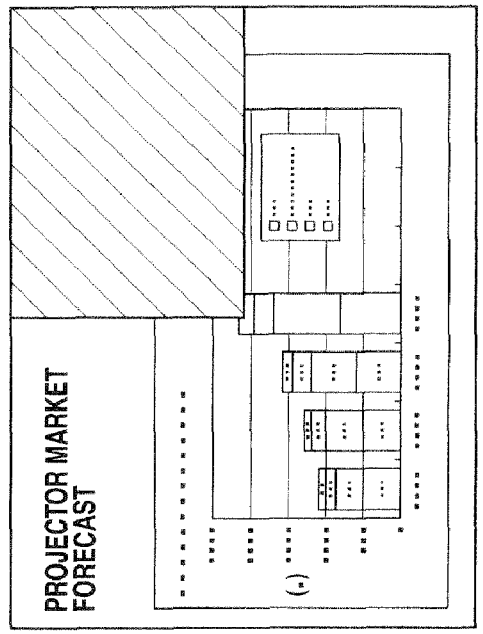
FIGS. 8A to 8D show concrete examples of picture blanking in the second embodiment.
Figure 8B:
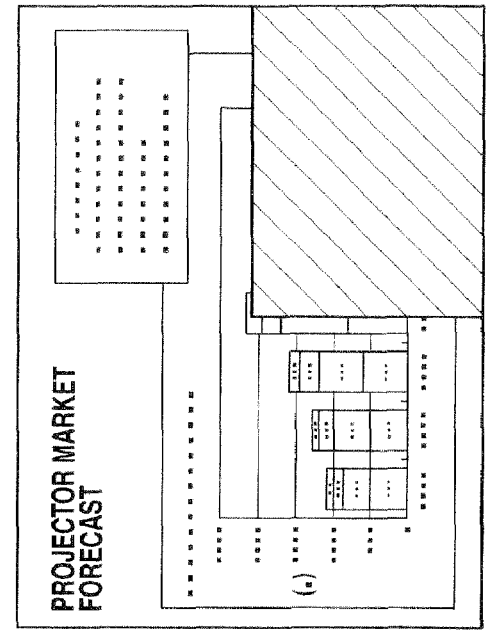
Figure 8C:
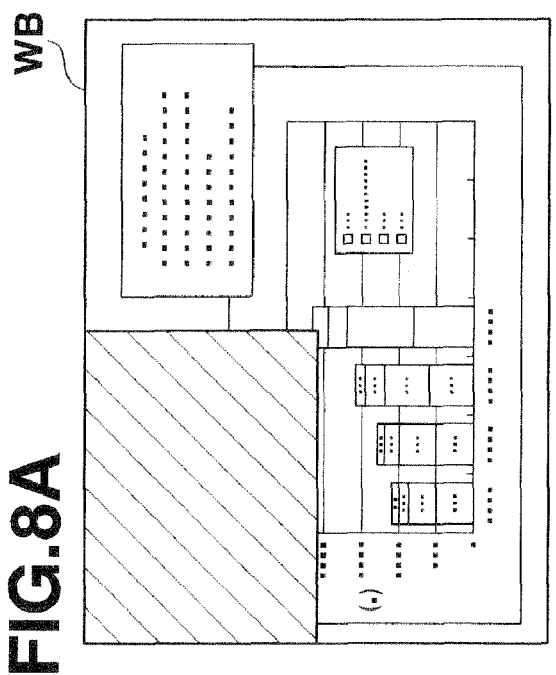
Figure 8D:
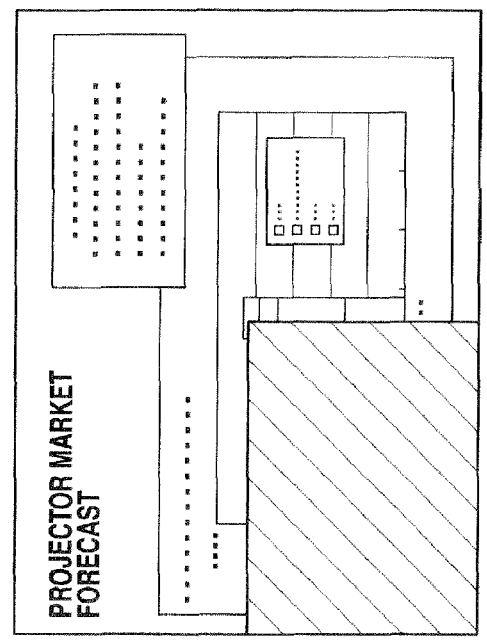

For example, when the picture blank key has been pressed for a long time in a picture-blanked state where the upper left quadrant of the screen has been masked as shown in FIG. 8A, a state where the upper right quadrant of the screen has been masked as shown in FIG. 8B, a state where the lower left quadrant of the screen has been masked as shown in FIG. 8C, and a state where the lower right quadrant of the screen has been masked as shown in FIG. 8D are transited in that order each time the operate time exceeds 1.0 second.

When the picture blank key has been pressed for a long time further in the picture-blanked state shown in FIG. 8D, control is performed in such a manner that the position to be masked moves cyclically as shown in FIG. 8A where the screen goes into a state where the upper left quadrant of the screen has been masked.

Accordingly, even when the picture blank key has been pressed for a longer time than necessary and the desired mask position has been passed, keeping pressing the picture blank key further enables the desired mask position to be reached reliably in an easy-to-understand manner.

If in step S213, it has been determined that the picture blank key in the operating unit 30 has been operated in a state where picture blanking has not been performed, the setting of picture blanking supposed to be done beforehand is read from the program memory 29 to go into a new picture-blanked state (step S217).

Then, the projected picture is blanked according to the newly set color and region on the basis of the read contents (step S218). In this state, control is returned to the processes in step S201 and forward.

As described above, with the second embodiment, it is possible to secure a region suitable for writing, while projecting the main part of the picture as in the first embodiment.

In addition, the second embodiment enables the picture blanking region to move sequentially in the projected picture each time a specific operation is carried out. This makes it possible to switch between a part to be checked and a part to be written into in the picture during the projection operation as needed by a simple operation.

While in the first and second embodiments, the picture blanking region has been selected from the prepared patterns, the invention is not limited to this. For instance, the data projection unit 10 may be provided with a picture-taking function for shooting a projected picture. An arbitrary region in the projected picture is specified using, for example, a laser pointer, enabling the user to recognize the specified region and set the recognized region as a region where picture blanking is to be performed.

In that case, a position in the projected picture can be specified with the laser pointer by causing the laser pointer to specify at least a pair of diagonal positions in a rectangular region each for a specific length of time, for example, 0.5 second or longer.

Furthermore, when the remote controller constituting the operating unit 30 of the data projection unit 10 is provided with a laser pointer specifying function, that is, when the remote controller is provided with the function of projecting a point image whose luminance is high as if it were the point position by the laser pointer so as to superimpose the point image on the original image in the projected picture on the data projection unit 10 by setting the laser pointer function on the remote controller and specifying the position of each of the up, down, right, and left pointers with the cursor keys, a region in the projected picture can be specified without the above-described picture-taking function, which makes it easier to specify the region.

Figure 9A:
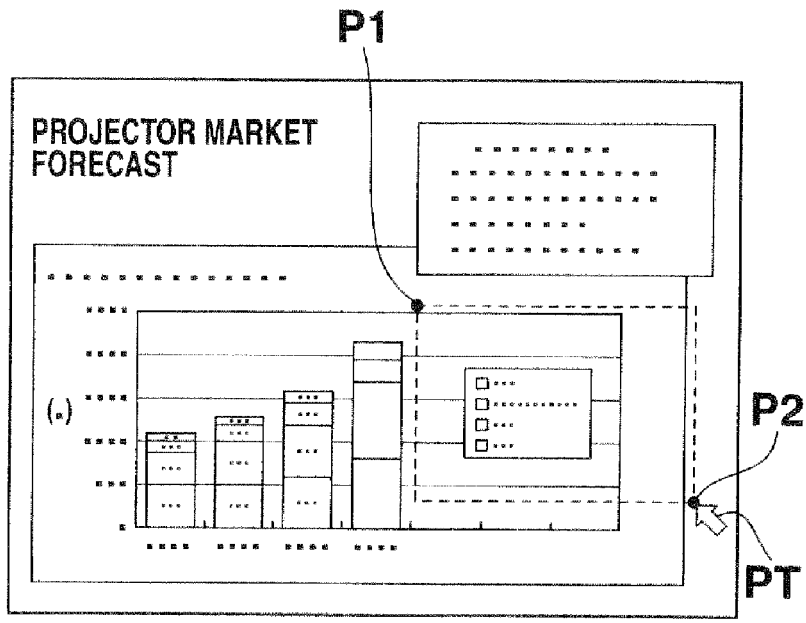
FIGS. 9A and 9B show concrete examples of picture blanking in the second embodiment.
Figure 9B:
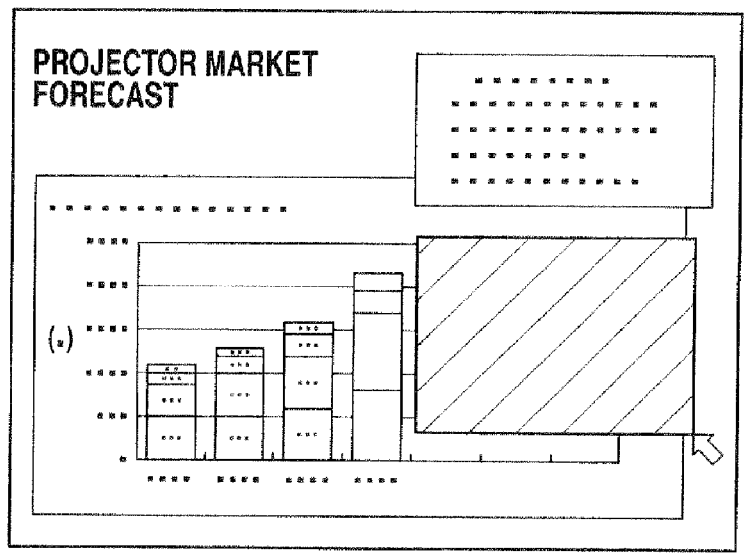

FIGS. 9A and 9B are diagrams to help explain a case where an arbitrary rectangular region in the projected picture is specified as described above. FIG. 9A shows a state where point P2, a diagonal position of a rectangle, is going to be specified after point P1, one point in the picture is specified with pointer PT.

As shown in FIG. 9A, pointer PT is moved to the position of point P2 and the point is specified, thereby completing the specification of the region, with the result that picture blanking is performed in the rectangular region as shown in FIG. 9B.

In the picture-blanked state shown in FIG. 9B, for example, when "Expansion/Reduction" has been selected in the item "Picture Blank (Change)," if a specific key is operated, for example, the picture blank key is pressed for a long time, the picture-blanked region is expanded in a stepwise manner at the beginning, with the center point of the rectangular region as a reference.

If the picture blank key is still being pressed for a long time at the time when the picture-blanked region has reached the entire screen, the picture-blanked region is then reduced in a stepwise manner, with the center point of the rectangular region as a reference.

Furthermore, if the picture blank key is still being pressed for a long time at the time when the picture-blanked region has reached a preset minimum region, the picture-blanked region is then expanded again in a stepwise manner.

As described above, by a simple operation, the user arbitrarily specifies the position of a region where picture blanking is to be performed, which makes it possible to secure a region suitable for writing or the like without interfering with the contents of the picture projected at that time.

In addition, the region where picture blanking is done in the projected picture is expanded or reduced progressively each time a specific operation is carried out. This makes it possible to switch between a part to be checked and a part to be written into as needed by a simple operation.

Furthermore, the picture blanking region is controlled so as to move cyclically, provided that, for example, the upper left of the screen is coupled with the lower right of the screen. Similarly, when the picture blanking region is expanded, if the region has reached the entire screen, then the region is reduced from this point on. When the picture blanking region is reduced, if the region has reached the minimum region, then the region is expanded from this point on.

As described above, when a change in the picture blanking region is controlled cyclically, even if a change has gone beyond the picture blanking position the user has expected, the user can reach the desired position reliably in an easy-to-understand manner by further pressing the picture blank key for a long time.

While in both of the first and second embodiments, the DLP (registered trademark) data projection unit has been explained, the invention imposes no limit on the devices forming a picture. The invention may be applied to other projection apparatuses, including a liquid-crystal projector using a transmissive color liquid-crystal panel in place of the micromirror device 16 and a field-sequential projection unit where each LED group of RGB acting as a light source emits light in a time-division manner according to color components, thereby causing a monochrome liquid-crystal panel to form and project a color picture.

This invention is not limited to the above embodiments and, on the basis of available skills in the present or future implementation phase, may be practiced or embodied in still other ways without departing from the spirit or character thereof. The individual embodiments may be combined suitably if at all possible. The embodiments include inventions of different stages and therefore various inventions can be extracted by combining suitably a plurality of structural requirements disclosed in the embodiments. For example, even if some are removed from all of the structural requirements shown in the embodiments, the resulting configuration can be extracted as an invention, provided that the effect of the invention is obtained.

What is claimed is:

1. A projection apparatus comprising:
   a projection unit which forms a picture corresponding to an input image signal and projects the formed picture;
   a specifying unit which specifies a picture blank region within a region of the picture projected by the projection unit, wherein the specifying unit specifies at least one of a size, a position, and a shape of the picture blank region;
   a projection control unit which causes the region of the picture projected by the projection unit to be limited in accordance with the picture blank region specified by the specifying unit by controlling a gradation of the picture; and
   an operation unit which supplies predetermined operation signals to the projection apparatus, the operation unit having a blank key,
   wherein the specifying unit moves the position of the picture blank region while maintaining the size of the picture blank region, if it is determined that the blank key of the operation unit is operated by a long-pressing operation.

2. The projection apparatus according to claim 1, further comprising a selection unit which selects a projection color corresponding to the picture blank region specified by the specifying unit,
   wherein the projection control unit causes the specified picture blank region to be projected in the projection color selected by the selection unit.

3. The projection apparatus according to claim 1, wherein the specifying unit specifies as the picture blank region one of a plurality of regions displayed in a setting screen prepared in advance.

4. The projection apparatus according to claim 1, wherein the specifying unit cyclically moves the position of the picture blank region if it is determined that the blank key is operated by the long-pressing operation.

5. A projection method for an apparatus including a projection unit that forms a picture corresponding to an input image signal and projects the formed picture onto an object, the projection method comprising:
   specifying a picture blank region within a region of the picture projected by the projection unit, wherein the specifying comprises specifying at least one of a size, a position, and a shape of the picture blank region;
   causing the region of the picture projected by the projection unit to be limited in accordance with the specified picture blank region by controlling a gradation of the picture; and
   accepting, through an operation unit having a blank key, input of predetermined operation signals to the apparatus,
   wherein the position of the picture blank region is moved while maintaining the size of the picture blank region, if it is determined that the blank key of the operation unit is operated by a long-pressing operation.

6. A non-transitory computer readable medium having a program stored thereon which is executable by a computer of a system including a projection unit that forms a picture corresponding to an input image signal and projects the formed picture onto an object, the program causing the computer to execute functions comprising:
   specifying a picture blank region within a region of the picture projected by the projection unit, wherein the specifying comprises specifying at least one of a size, a position, and a shape of the picture blank region;
   causing the region of the picture projected by the projection unit to be limited in accordance with the specified picture blank region by controlling a gradation of the picture and
   accepting, through an operation unit having a blank key, input of predetermined operation signals to the apparatus,
   wherein the position of the picture blank region is moved while maintaining the size of the picture blank region, if it is determined that the blank key of the operation unit is operated by a long-pressing operation.

7. A projection apparatus comprising:
   a projection unit which forms a picture corresponding to an input image signal and projects the formed picture;
   a specifying unit which specifies a picture blank region within a region of the picture projected by the projection unit, wherein the specifying unit specifies at least one of a size, a position, and a shape of the picture blank region;
   a projection control unit which causes the region of the picture projected by the projection unit to be limited in accordance with the picture blank region specified by the specifying unit by controlling a gradation of the picture; and
   an operation unit which supplies predetermined operation signals to the projection apparatus, the operation unit having a blank key,
   wherein the specifying unit changes the size of the picture blank region while maintaining a position of the picture blank region, if it is determined that the blank key of the operation unit is operated by a long-pressing operation.

8. The projection apparatus according to claim 7, wherein the specifying unit sequentially and progressively expands the size of the picture blank region if it is determined that the blank key is operated by the long-pressing operation.

9. The projection apparatus according to claim 7, wherein the specifying unit sequentially and progressively reduces the size of the picture blank region if it is determined that the blank key is operated by the long-pressing operation.

10. The projection apparatus according to claim 7, wherein, if it is determined that the blank key is operated by the long-pressing operation, the specifying unit (i) progressively expands the size of the picture blank region, (ii) reduces the picture blank region if the size of the picture blank region reaches a size of an entirety of the region of the picture, and (iii) again expands the size of the picture blank region if the picture blank region reaches a preset minimum region.

11. The projection apparatus according to claim 7, wherein the specifying unit changes the size of the picture blank region with respect to a center point of the picture blank region.

12. The projection apparatus according to claim 7, wherein the projection control unit releases the limit of the region of the picture projected by the projection unit if it is determined that an operation of the blank key of the operation unit is not the long-pressing operation.

13. A projection method for an apparatus including a projection unit that forms a picture corresponding to an input image signal and projects the formed picture onto an object, the projection method comprising:
specifying a picture blank region within a region of the projected picture, wherein at least one of a size, a position, and a shape of the picture blank region is specified;
causing the region of the projected picture to be limited in accordance with the specified picture blank region by controlling a gradation of the picture; and
accepting input of predetermined operation signals by an operation unit having a blank key,
wherein the size of the picture blank region is changed while maintaining a position of the picture blank region, if it is determined that the blank key of the operation unit is operated by a long-pressing operation.

14. A non-transitory computer readable medium having a program stored thereon which is executable by a computer of a system including a projection unit that forms a picture corresponding to an input image signal and projects the formed picture onto an object, the program causing the computer to execute functions comprising:
specifying a picture blank region within a region of the projected picture, wherein at least one of a size, a position, and a shape of the picture blank region is specified;
causing the region of the projected picture to be limited in accordance with the specified picture blank region by controlling a gradation of the picture; and
accepting input of predetermined operation signals by the operation unit,
wherein the size of the picture blank region is changed while maintaining a position of the picture blank region, if it is determined that the blank key of the operation unit is operated by a long-pressing operation.

* * * * *